United States Patent Office 3,540,884
Patented Nov. 17, 1970

3,540,884
METHOD OF MANUFACTURE OF CELLULAR REFRACTORY OR METALLIC MATERIALS
Eric A. Horbury, Loughborough, England, assignor to Rolls-Royce Limited, Derby, England, a British company
No Drawing. Filed June 10, 1968, Ser. No. 735,586
Claims priority, application Great Britain, June 27, 1967, 29,507/67
Int. Cl. B22f 3/10
U.S. Cl. 75—211          9 Claims

ABSTRACT OF THE DISCLOSURE

The invention comprises a method of producing a cellular material in which a slurry is made from a powder of a metal, alloy or refractory material and a liquid binder, organic particles of preselected size are added to the slurry and the slurry is then allowed to solidify, whereupon the solid is heated at a carefully controlled rate so as to decompose and remove all organic matter due to the particles and the binder without destroying the solid and further heated to sinter the resulting powder structure.

---

This invention relates to a method of producing cellular refractory or metallic materials.

It is an object of the present invention to provide a method of producing cellular refractory and/or metallic materials having a pre-selected cell size.

According to the present invention a method of producing cellular refractory and/or metallic materials comprises the steps of forming a slurry of a metal or refractory material in powder form and a liquid binder, the binder being capable of setting into a solid state, adding to the slurry a pre-determined number of organic particles of a pre-selected size and solidifying the mixture, heating the solid in air to a first temperature so as to decompose the binder and the organic particles to carbon without destroying the solid, subsequently heating the solid from the first temperature to a second temperature so as to oxidise and drive off substantially all the carbon, thereby producing a loosely bonded structure of metal or refractory powder and finally heating the powdered structure from the second temperature to a third temperature so as to sinter the powder into a cellular product, the solid being heated, at least to the first temperature, at such a rate that the rate of temperature rise of the solid does not substantially exceed a rate T° C. per hour given by $$T = \frac{80}{(y + \frac{1}{2})}$$

where $y$ is the diameter in inches of the largest sphere that may be wholly contained within the solid.

Preferably, the solid is heated from the first temperature to the second temperature at a rate not exceeding the rate specified in the preceding paragraph.

The sintering process may take place in a reducing, neutral or reacting atmosphere.

The inventiton also comprises a method of producing a silicon nitride foam comprising the steps of forming a slurry of silicon powder and liquid binder, mixing with the slurry a quantity of particles of organic material and allowing the mixture to cure into a solid state, heating the solid sufficiently slowly in air to decompose the binder and the organic material to carbon without destroying the solid, further heating the solid so as to oxidize and drive off substantially all the carbon thereby producing a loosely bonded powder structure, further heating the powder structure in an atmosphere of nitrogen so as to reaction sinter the powder structure and finally heating the reaction sintered structure in the nitrogen atmosphere until the structure is substantially completely nitrided.

Preferably, the melting point of the binder in its solid state is higher than the melting point of the organic particles.

The liquid binder may be a resin and may, for example, be a phenolic or methacrylate resin.

Alternatively and preferably, the liquid binder is an epoxy resin.

The organic particles may be of any shape, but are preferably substantially spherical, and may be hollow or solid.

The organic particles may be made from epoxy resins, natural resins or waxes.

Alternatively and preferably, the organic particles may be made from sugars, such as for example nonpareils.

After the mixture of the particles with the powder and liquid binder has been made and while it is still in liquid form it may be cast into any desired shape before being allowed to solidify. The resulting solid can be sufficiently hard to be capable of machining and thus intricate shapes may be formed.

Part of the surface of the materials produced by the above methods may be covered with an impervious skin to prevent the passage therethrough of liquids and gases.

The porosity of an object made according to the present invention may be made to vary throughout the object by casting in layers using different sizes of organic particles.

The following examples serve to illustrate, merely by way of non-limitative example, the many materials which may be produced by the method according to the present invention.

In each of the examples, the mesh referred to is British Standard mesh.

EXAMPLE 1

A slurry was made by mixing:

| | Parts/wt. |
|---|---|
| Nickel powder (—400 mesh) | 2 |
| Epoxy resin ("Araldite") | 1 |
| Epoxy resin ("Araldite") (CY 219) | 1 |
| Sugar known as nonpareils 0.050–0.060" diam. | 4 |

("Araldite" is a registered Trademark).

A rectangular bar was cast using the above mix and allowed to cure overnight. The fully cured bar was placed into a furnace capable of retaining a hydrogen atmosphere. A flow of air was passed through the furnace and the temperature raised at the rate of 50° C./hr. to 300° C., and held at this temperature for 2 hours. At this stage substantially all the epoxy resin and nonpareils was carbonized. The furnace temperature was further raised at 50° C./hr. to 500° C., and this temperature was held for 2 hours so as to drive off substantially all the carbon. The furnace was purged with argon to replace the air; the argon was then replaced with hydrogen. The furnace temperature was then raised to 1200° C. at a rate of 200° C./hr. and held at this temperature for 4 hours so as to sinter the nickel, the hydrogen serving to reduce any oxides produced in the earlier heating steps. The furnace was then cooled to 500° C. and the hydrogen atmosphere displaced with argon, the furnace was further cooled to 100° C. when the sample was removed.

The product of this example was a nickel foam, which had a density of 3.00 gms./cc. and cell size of 0.040–0.050″ diam.

EXAMPLE 2

A slurry was made by mixing:

| | Parts/wt. |
|---|---|
| Nickel powder (—400 mesh) | 0.2 |
| Nickel powder (—80+100 mesh) | 1.8 |
| Epoxy resin | 0.75 |
| Epoxy spheres 0.090–0.140″ diam. | 3 |

The sample was processed as Example 1 to give a cellular nickel product with a density of 2.2 gms./cc. and cell size of 0.075–0.125″ dia.

EXAMPLE 3

A slurry was made by mixing:

| | Parts/wt. |
|---|---|
| Chromium powder (—300 mesh) | 2.5 |
| Epoxy resin | 1 |
| Nonpareils 0.050–0.060″ diam. | 4 |

A rectangular bar was cast using the above mix and allowed to cure overnight. The fully cured bar was placed into a furnace capable of retaining a hydrogen atmosphere. A flow of air was passed through the furnace and the temperature raised at the rate of 50° C./hr. to 350° C. and held at this temperature for 4 hours. The furnace was purged with argon to displace the air and then with hydrogen to displace the argon. The furnace temperature was further raised to 600° C. at the rate of 50° C./hr. and then raised to 1500° C. at the rate of 200° C./hr., and held at this temperature for 4 hours. The furnace was then cooled to 400° C., and the hydrogen atmosphere displaced with argon; the furnace was further cooled to 100° C. when the sample was removed.

The product of this example was a chromium foam with a density of 2.7 gms./cc. and cell size of 0.040–0.50″ diam.

EXAMPLE 4

A slurry was made by mixing:

| | Parts/wt. |
|---|---|
| An 80/20 nickel/chromium alloy (—400 mesh) | 2.5 |
| Epoxy resin | 1 |
| Nonpareil 0.020–0.025″ diam. | 4 |

The sample was treated as Example 1.

The resulting foam was an 80/20 nickel/chromium alloy with cell sizes 0.018–0.023″ diam. and a density of 3.00 gms./cc.

EXAMPLE 5

A slurry was made by mixing:

| | Parts/wt. |
|---|---|
| Zirconium oxide (—250 mesh) | 1.8 |
| Epoxy resin | 0.75 |
| Nonpareils 0.050–0.060″ diam. | 3 |

A rectangular bar was cast using the above mix and allowed to cure overnight. The fully cured bar was placed into a furnace capable of retaining a hydrogen atmosphere. A flow of air was passed through the furnace and the temperature was raised at the rate of 50° C./hr. to 300° C. and held at this temperature for 2 hours. The furnace temperature was further raised at 50° C./hr. to 500° C. and this temperature held for 2 hours. The furnace was purged with argon to replace the air, the argon was then replaced with hydrogen. The furnace temperature was now raised to 1200° C. at a rate of 200° C./hr. and held at this temperature for 4 hours. The furnace was then cooled to 500° C. and the hydrogen atmosphere displaced with argon. The furnace was further cooled to 100° C. when the sample was removed.

The sample was further heated in air to 1900° C. and cooled.

The resulting foam was a zirconium oxide foam with a density of 1.4 gms./cc. and a cell size of 0.045–0.055″ diam.

The reactions involved in Examples 1 to 5 are basically similar.

EXAMPLE 6

A slurry was made by mixing:

| | Parts/wt. |
|---|---|
| Silicon powder (—400 mesh) | 1.5 |
| Epoxy resin | 1 |
| Nonpareils 0.050–0.060″ diam. | 2.5 |

A bar was cast using the above mix and allowed to cure overnight. The fully cured bar was placed into a furnace capable of retaining a nitrogen atmosphere. A flow of air was passed through the furnace and the temperature raised at the rate of 50° C./hr. to 300° C. and held at this temperature for 1 hour. The furnace temperature was further raised at 50° C./hr. to 450° C. and this temperature held for 4 hours. At this stage substantially all carbon due to the epoxy resin and nonpareils had been driven off. The furnace was purged with nitrogen to replace the air. The temperature was now raised to 1100° C. at a rate of 200° C./hr. and held at this temperature for 4 hours so as to reaction sinter the powdered silicon structure left after the carbon had been driven off. The temperature was further raised to 1450° C. at a rate of 50° C./hr. and held at this temperature until the sample was fully nitrided. The furnace was allowed to cool and the sample removed.

The resulting sample was a foam of silicon nitride having a density of 0.75 gm./cc. and a cell size of 0.045–0.055″ diam.

In each of the above examples the rate of heating of the sample bar up to the start of the sintering process was controlled so that the rate of temperature rise of the bar did not substantially exceed a rate T° C. per hour given by $$T = \frac{80}{(y + \frac{1}{2})}$$

where $y$ was the diameter in inches of the largest hypothetical sphere which could be wholly contained within the bar, i.e., twice the furthest distance that gas liberated within the bar would have to travel to reach the nearest point on the external surface of the bar.

The organic particles and the binder were selected so that the melting point of the former was lower than that of the latter in its solid state. The organic particles therefore melt first during the initial heating step, before the binder has lost all its strength. Because of the controlled rate of temperature rise in the bar provided by heating in accordance with the above formula, the liquefied organic particles may expand so as to gently rupture the walls between adjacent cells, thus producing a highly porous structure in the finished product while enabling the gases produced when the organic particles and the binder finally decomposed to escape readily.

The main advantage of the above method over previously known methods is that by selecting the sizes, shapes and numbers of the organic particles which are added to the slurry the density and porosity of the resulting material can be quite accurately controlled.

Secondary advantages are that the method is suitable for the production of large articles and moreover the articles may be machined to any desired shape once the mixture has hardened into solid form.

The materials produced by the method hereinbefore described have good heat insulating properties combined with relatively high strength at high temperatures and may be used to thermally insulate members disposed in hot parts of gas turbine engines.

It will be clear that any organic particles may be used provided that they can be decomposed and entirely removed from the solid by heating and the specification is not meant to be restricted to the particular examples quoted.

Further the terms refractory and/or metallic material is meant to include metals, metal alloys, refractory metals and refractory materials, for example, ceramics.

It will be appeciated that atmospheres other than those specified in the examples may be used during the sintering process. Thus nitrogen, which is a reacting atmosphere in Example 5, would be a neutral atmosphere in some of the other examples.

I claim:
1. A method of producing a cellular material from a material selected from the group comprising metals, alloys and refractory materials, comprising the steps of forming a slurry of the selected material in powder form and a liquid binder, the binder being capable of setting into a solid state, adding to the slurry a pre-determined number of organic particles of a pre-selected size and solidifying the mixture, heating the solid in air to a first temperature so as to decompose the binder and the organic particles to carbon without destroying the solid, subsequently heating the solid from the first temperature to a second temperature so as to oxidize and drive off substantially all the carbon, thereby producing a loosely bonded structure of metal or refractory powder and finally heating the powdered structure from the second temperature to a third temperature so as to sinter the powder into a cellular product, the solid being heated, at least to the first temperature, at such a rate that the rate of temperature rise of the solid does not substantially exceed a rate T° C. per hour given by

$$T = \frac{80}{y\left(+\frac{1}{2}\right)}$$

where $y$ is the diameter in inches of the largest sphere that may be wholly contained within the solid.

2. A method as claimed in claim 1, wherein the solid is heated from the first temperature to the second temperature at a rate not exceeding said rate T° C. per hour.

3. A method as claimed in claim 1, wherein the sintering process takes place in an atmosphere selected from the group comprising reducing, neutral and reacting atmospheres.

4. A method as claimed in claim 1, wherein the melting point of the binder in its solid state is higher than the melting point of the organic particles.

5. A method as claimed in claim 1, wherein the liquid binder is selected from the group comprising phenolic resins and methacrylate resins.

6. A method as claimed in claim 1, wherein the liquid binder is an epoxy resin.

7. A method as claimed in claim 1, wherein the organic particles are made from a material selected from the group comprising epoxy resins, natural resins and waxes.

8. A method as claimed in claim 1, wherein the organic particles are made from a sugar.

9. A method as claimed in claim 8, wherein the sugar is nonpareils.

References Cited
UNITED STATES PATENTS

| | | | |
|---|---|---|---|
| 3,052,967 | 9/1962 | Fischer | 75—222 XR |
| 3,234,308 | 2/1966 | Herrmann | 264—63 |
| 3,287,112 | 11/1966 | Blaha | 75—222 |
| 3,408,180 | 10/1968 | Winkler | 264—44 XR |
| 3,433,632 | 3/1969 | Elbert | 75—22 |

BENJAMIN R. PADGETT, Primary Examiner

A. J. STEINER, Assistant Examiner

U.S. Cl. X.R.

75—222, 224, 225; 264—44, 56, 66

UNITED STATES PATENT OFFICE
CERTIFICATE OF CORRECTION

Patent No. 3,540,884       Dated November 17, 1970

Inventor(s) ERIC A. HORBURY

It is certified that error appears in the above-identified paten and that said Letters Patent are hereby corrected as shown below:

Claim 1, Colume 5, lines 37 to 40:

Change "$T = \dfrac{80}{y(+1/2)}$" to --$T = \dfrac{80}{(y+1/2)}$--

Signed and sealed this 6th day of August 1974.

(SEAL)
Attest:

McCOY M. GIBSON, JR.      C. MARSHALL DANN
Attesting Officer      Commissioner of Patents